United States Patent [19]

Hsu

[11] Patent Number: 5,682,474
[45] Date of Patent: Oct. 28, 1997

[54] METHOD OF DYNAMIC PROTECTION AND ITS APPARATUS

[75] Inventor: Jerry Hsu, Tainan, Taiwan

[73] Assignee: United Microelectronics Corp., Hsinchu, Taiwan

[21] Appl. No.: 631,671

[22] Filed: Apr. 9, 1996

[51] Int. Cl.$^6$ .................................................. G06F 11/00
[52] U.S. Cl. .......................................................... 395/186
[58] Field of Search ................................. 395/186, 491; 380/3, 4, 5, 6, 20, 46, 50

[56] References Cited

U.S. PATENT DOCUMENTS

| | | | |
|---|---|---|---|
| 4,584,665 | 4/1986 | Vrielink | 395/186 |
| 4,689,606 | 8/1987 | Sato | 340/347 |
| 4,694,412 | 9/1987 | Domenik et al. | 364/717 |
| 4,736,421 | 4/1988 | Morita et al. | 380/20 |
| 4,947,318 | 8/1990 | Mineo | 395/186 |
| 4,991,209 | 2/1991 | Kolbert | 380/28 |
| 5,131,091 | 7/1992 | Mizuta | 395/186 |
| 5,150,407 | 9/1992 | Chan | 380/4 |
| 5,214,697 | 5/1993 | Saito | 380/4 |
| 5,276,738 | 1/1994 | Hirsch | 380/46 |
| 5,343,524 | 8/1994 | Mu et al. | 380/4 |
| 5,581,763 | 12/1996 | Hait | 395/186 |

OTHER PUBLICATIONS

MCS-80 User's Manual, Intel, p. 11, 1974.

Mano, "Digital Design", Prentice Hall, pp. 126-147, 257-289, 462, 1991.

*Primary Examiner*—Robert W. Beausoliel, Jr.
*Assistant Examiner*—Joseph E. Palys
*Attorney, Agent, or Firm*—Jones & Askew, LLP

[57] ABSTRACT

A dynamic protecting method and its apparatus protect the data transferred on bus. The dynamic protecting apparatus consists of a number generating device to generate a sequence of number signals and a decoder on the bus. The decoder will receive and decode data from the bus with the number signals generated by number generating device to generate a decoded program data and output it to the bus. The dynamic protecting method comprises of the following steps: A number generating device is set to generate an initial value of number signals by accessing program data through the bus. The number generating device will generate a sequence of number signals in accessing the program data according to the initial value. Inputting the data and the above mentioned number signals in sequence into a decoder, a decoded data is generated and sent to the bus.

2 Claims, 9 Drawing Sheets

| Q0 | Q1 | Q2 | Q3 | Q4 |
|----|----|----|----|----|
| 1 | 1 | 1 | 1 | 1 |
| 0 | 1 | 1 | 1 | 1 |
| 0 | 0 | 1 | 1 | 1 |
| 0 | 0 | 0 | 1 | 1 |
| 0 | 0 | 0 | 0 | 1 |
| 1 | 0 | 0 | 0 | 0 |
| 0 | 1 | 0 | 0 | 0 |
| 0 | 0 | 1 | 0 | 0 |
| 0 | 0 | 0 | 1 | 0 |
| 1 | 0 | 0 | 0 | 1 |
| 1 | 1 | 0 | 0 | 0 |
| 0 | 1 | 1 | 0 | 0 |
| 0 | 0 | 1 | 1 | 0 |
| 1 | 0 | 0 | 1 | 1 |
| 0 | 1 | 0 | 0 | 1 |
| 0 | 1 | 0 | 1 | 0 |
| 1 | 0 | 1 | 0 | 0 |
| 0 | 1 | 0 | 1 | 0 |
| 1 | 0 | 1 | 0 | 1 |
| 1 | 1 | 0 | 1 | 0 |
| 1 | 1 | 1 | 0 | 1 |
| 1 | 1 | 1 | 1 | 0 |

FIG. 9

| Q0 | Q1 | Q2 | Q3 | Q4 |
|---|---|---|---|---|
| 1 | 1 | 1 | 1 | 1 |
| 0 | 1 | 1 | 1 | 1 |
| 0 | 0 | 1 | 1 | 1 |
| 0 | 0 | 0 | 1 | 1 |
| 1 | 0 | 0 | 0 | 1 |
| 0 | 1 | 0 | 0 | 0 |
| 0 | 0 | 1 | 0 | 0 |
| 0 | 0 | 0 | 1 | 0 |
| 1 | 1 | 0 | 0 | 1 |
| 0 | 1 | 1 | 0 | 0 |
| 1 | 0 | 1 | 1 | 0 |
| 1 | 0 | 0 | 1 | 1 |
| 0 | 1 | 0 | 1 | 1 |
| 1 | 0 | 1 | 0 | 1 |
| 1 | 1 | 0 | 1 | 0 |
| 1 | 1 | 1 | 0 | 1 |
| 1 | 1 | 1 | 1 | 0 |

FIG. 10

| Q0 | Q1 | Q2 | Q3 |
|---|---|---|---|
| 1 | 1 | 0 | 1 |
| 1 | 1 | 1 | 0 |
| 1 | 1 | 1 | 1 |
| 0 | 1 | 1 | 1 |
| 0 | 0 | 1 | 1 |
| 0 | 0 | 0 | 1 |
| 1 | 1 | 0 | 1 |
| 1 | 1 | 1 | 0 |

FIG. 13

| Q0 | Q1 | Q2 | Q3 |
|---|---|---|---|
| 1 | 0 | 1 | 1 |
| 0 | 1 | 0 | 1 |
| 1 | 0 | 1 | 0 |
| 1 | 1 | 0 | 1 |
| 1 | 1 | 1 | 0 |
| 1 | 1 | 1 | 1 |
| 0 | 1 | 1 | 1 |
| 0 | 0 | 1 | 1 |
| 0 | 0 | 0 | 1 |
| 1 | 0 | 1 | 1 |
| 0 | 1 | 0 | 1 |
| 1 | 0 | 1 | 0 |

FIG. 14

METHOD OF DYNAMIC PROTECTION AND ITS APPARATUS

BACKGROUND OF THE INVENTION

1. Field of the Invention

This invention relates in general to a method of dynamic protection and its apparatus, and in particular to a dynamic decoding method which could vary with time to protect the data transferred on bus and its apparatus.

2. Description of Related Art

At present, TV game consoles are well-known popular consumer product. The conventional TV game console includes a stationary and standardized hardware console and a diversified and removable game software cartridge. That is to say, a consumer may buy favorite game software to execute after choosing a hardware console. Typical game software is stored in a memory IC cartridge, a disk or a CD-ROM so that the player could change the software cartridge easily on the hardware console to play different games.

In program execution, programs and data in memory devices have to be transferred through a bus to the CPU in the console, so that, it is easy for counterfeiters to make and sell copies. Besides, since most of the above-mentioned memory devices are made of standard integrated circuits, the design will allow counterfeiters to make a mass of copies more easily.

Conventional methods of software program protection are to collate the communication protocol between software and carrier, or to check if the contents of programs or the contents of data codes match with the contents of the original. Because these software program protection modes are fixed, if the protection of one game software program is cracked, thereafter, all the protection will be cracked easily.

An example of such prior art system is found in R.O.C. Patent no. 96107 issued to Japanese FamiCom and super FamiCom, wherein microprocessors are used as protection devices and are put on both console and cartridge. These protection devices will automatically check with each other as code execution starts. If the data mismatch each other, the protection devices will stop the execution in the console or prohibit the data output of the cartridge program. Cracking this kind of protection is more difficult; however, once a protecting IC is cracked, all the software which uses the same protecting IC as this cracked IC will be cracked without any protection.

The PC Engine of the Japanese NEC company is another example. The memory IC of its cartridge is a specially designed read only memory with faster accessing speed. No counterfeit could be produced in the beginning from the advent of the PC Engine. However, fast read-only memory became available in the market due to the progress of semiconductor design after two years, and the protection is no longer effective. The deficiencies of the conventional protecting devices of TV game consoles will be further discussed hereinafter.

Referring to FIG. 1, a TV game console 1 with a conventional protecting device 34 includes a console 10 and a software cartridge 30. The software cartridge 30 contains a memory device 32 for storing game program and a protecting device 34 for protecting program data. The program data is transferred to the console 10 through buses 20 and 22. The console 10 has an I/O interface 15 for receiving operating signal from a joystick 24, a memory 18 for storing the program data and the operating signal, a video random access memory 17 for storing picture data, a picture processing unit (PPU) 12 for processing the picture data and to cooperate with a programmable sound generator PSG 16 for processing audio data, and compose a TV signal through a TV signal composition device 19, then to display it on a TV monitor 26. The central processing unit CPU 14 controls the operation of all the above mentioned devices according to a system clock signal.

One example of the protecting device 34 is shown in FIG. 2 which is a block diagram disclosed in R.O.C. Patent No. 230,245 titled "Protecting System". The working principle of the protecting device 34 is to use multiple registers 36 (0-N) to store protected data by block, and to control the connection of alternating device 38 according to the protected data in the addressed register, so as to protect the software output from the memory device 32.

The deficiency of the above discussed structure is in that when protected data is stored into the registers 36 (0-N) in sequence and a register is addressed to change the connection of the alternating device 38 according to the protected data, since the protected data is set and its corresponding relation is determined, the correct data can be read out by ROM dump using a conventional in-circuit emulator (ICE). In another embodiment of single register, the protected data must be changed dynamically, therefore the programming is more difficult. Besides, since the change of protected data must be written by program, a counterfeiter could use the single-step execution function of an ICE to find out the corresponding relation of the alteration of connection and to decode it.

Another example of the protecting device 34 is shown in FIG. 3 which is disclosed in R.O.C. Patent No. 69,824 titled "Programmable Encoding/Decoding Device". Data stored in a register 31 and memory device 32 is processed by decoder 35 to become executable program and data for a CPU. The program and data is protected by setting the decoding status of decoder 33 by a programmer to change the data stored in register 31. However, since the change of the input of the decoder 35 must be written by program, a counterfeiter could also use single-step execution by an ICE to find out the rule of decoding. Moreover, its programming is tedious, and therefore it does not resolve the problem of pirate copying of software cartridges.

SUMMARY OF THE INVENTION

It is therefore an object of the present invention to provide a method of dynamic protection and a device to protect the data transferred on a bus. The dynamic protecting device generates a number of number signals by a number generating device, and decodes the data stored in a memory device to protect a software program.

One of the characteristics of the present invention is that the number generating device is an N-bit random number generating device, and includes a feedback circuit to generate a sequence of number signals.

Another characteristic of the present invention is that the number generating device could be a preloadable linear feedback shift register which accepts different initial values of the sequence of number signals.

A further characteristic of the present invention is that the number signals automatically vary with time that need not be changed by the program. Besides, each time the number signal are output, it varies automatically so that it is more difficult to crack.

BRIEF DESCRIPTION OF THE DRAWINGS

Other objects, features, and advantages of the present invention will become apparent by way of the following detailed description of the preferred but non-limiting embodiments. The description is made with reference to the accompanying drawings in which:

FIG. 9 shows a sequence of number signals generated by the number generating device in the dynamic protecting device according to the present invention;

FIG. 10 shows another sequence of number signals generated by the number generating device in the dynamic protecting device according to the present invention;

FIG. 13 shows a sequence of number signals generated by the embodiment of the number generating device shown in FIG. 12 in the present invention; and FIG. 14 shows another sequence of number signals generated by the embodiment of the number generating device shown in FIG. 12 in the present invention.

DESCRIPTION OF THE PREFERRED EMBODIMENT

Figure 1:
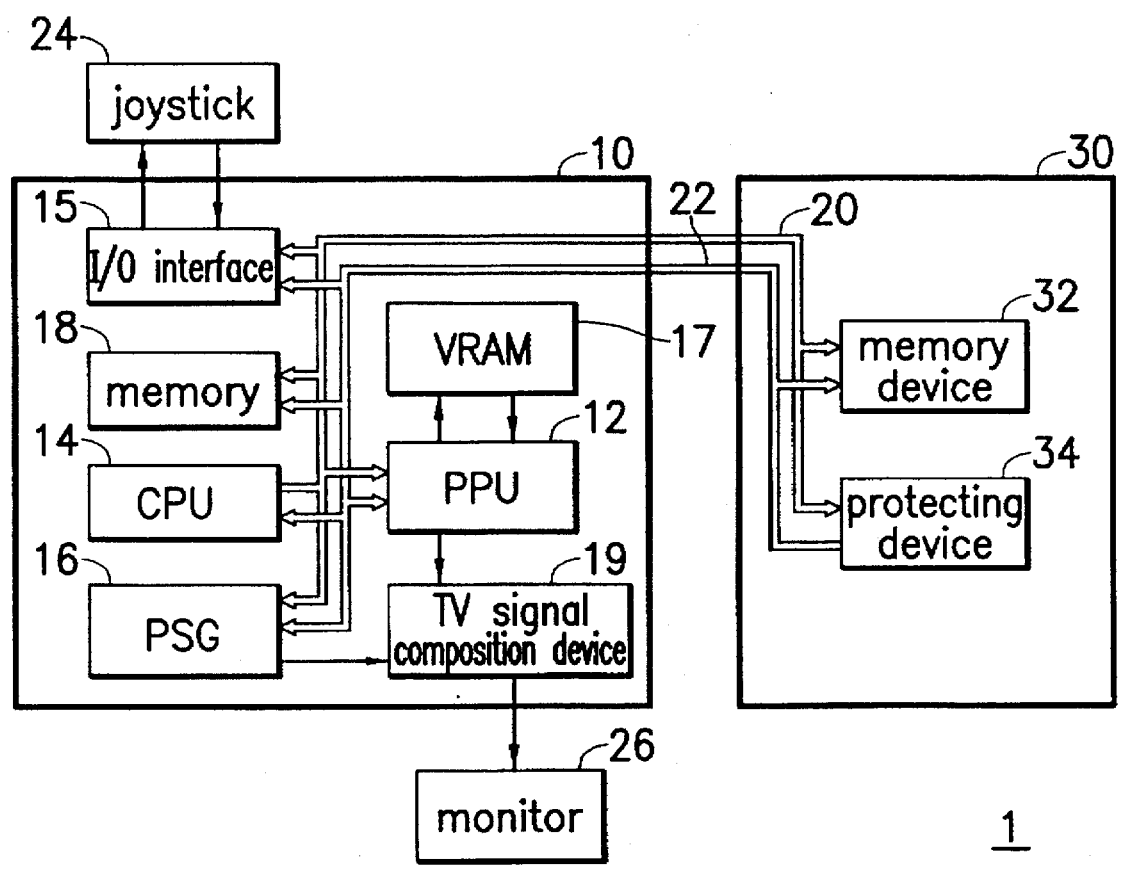
FIG. 1 is a block diagram of a conventional TV game console.
Figure 2:
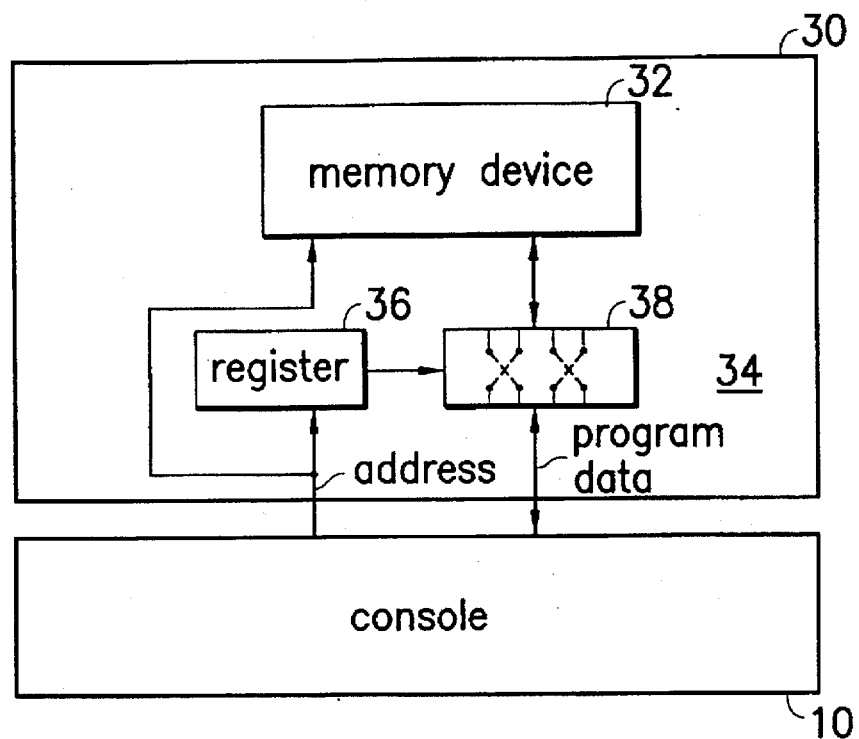
FIG. 2 shows an embodiment of a TV game console with a conventional protecting device.
Figure 3:
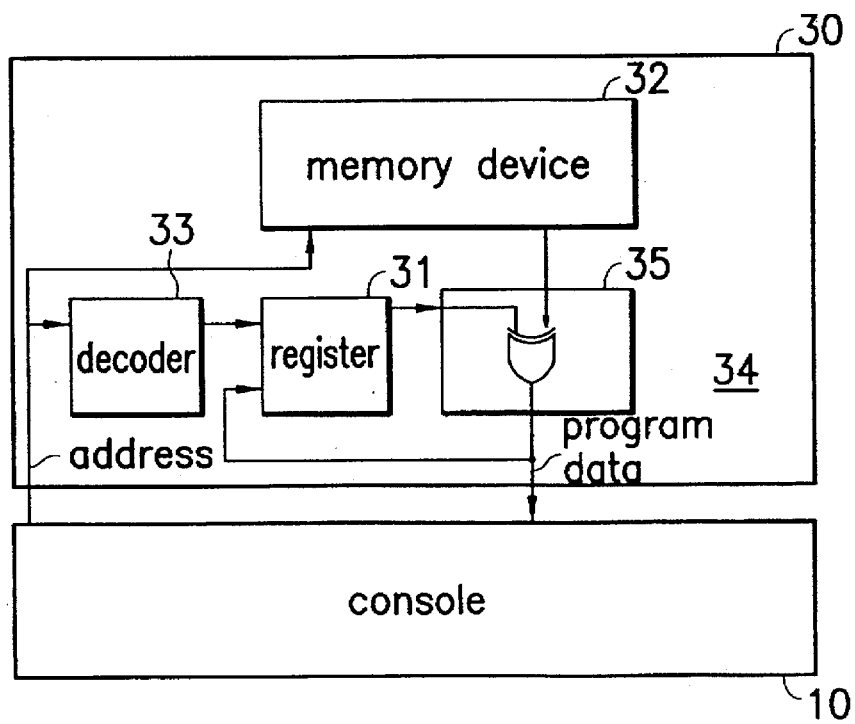
FIG. 3 shows another embodiment of a TV game console with a conventional protecting device.
Figure 4:
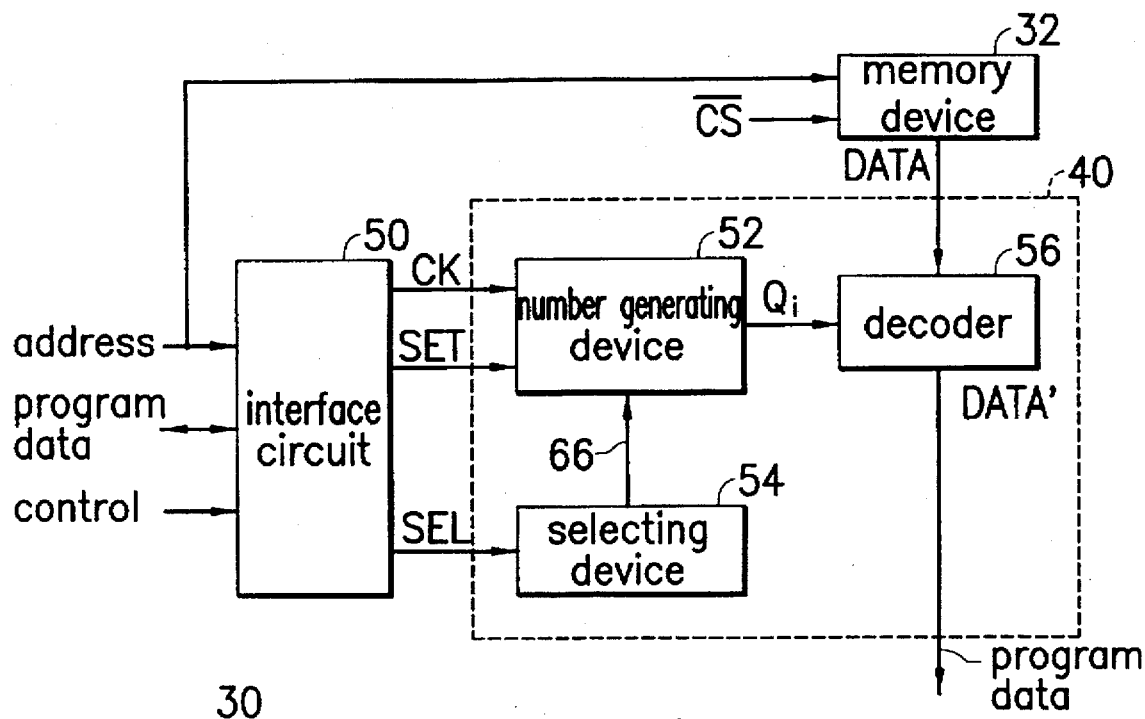
FIG. 4 shows the structure of a software cartridge with a protecting device according to the present invention, on a TV game console.
Figure 5:
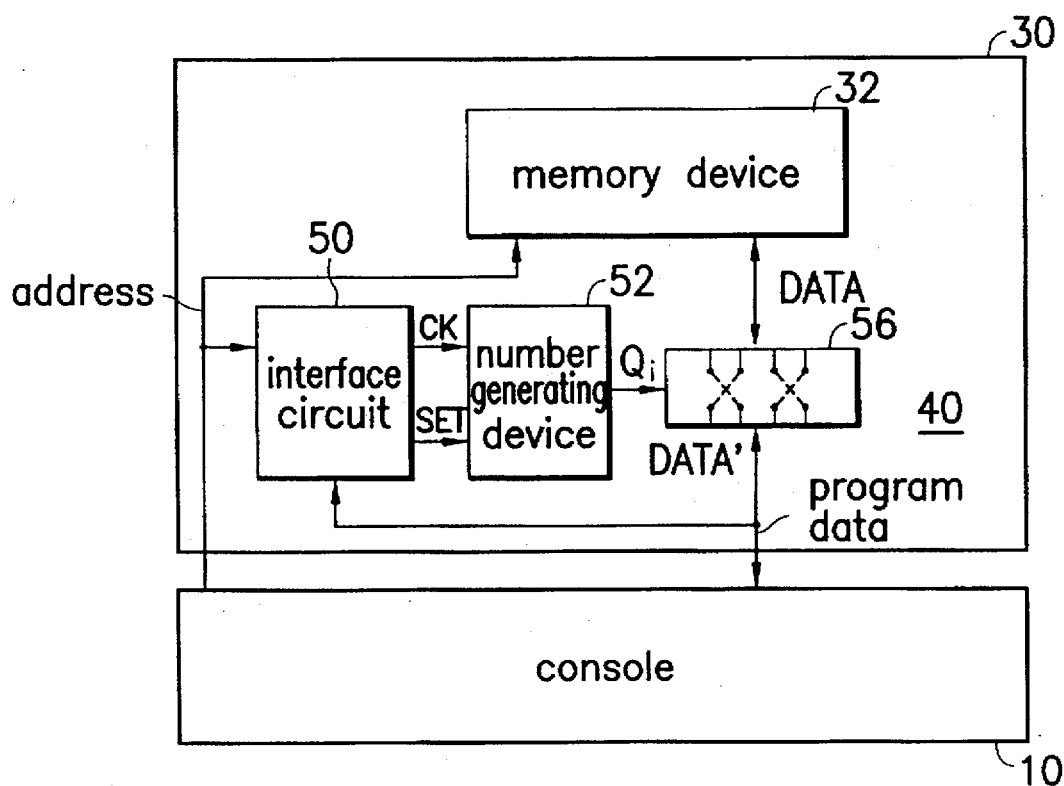
FIG. 5 shows a first embodiment of the TV game console with the protecting device according to the present invention.
Figure 6:
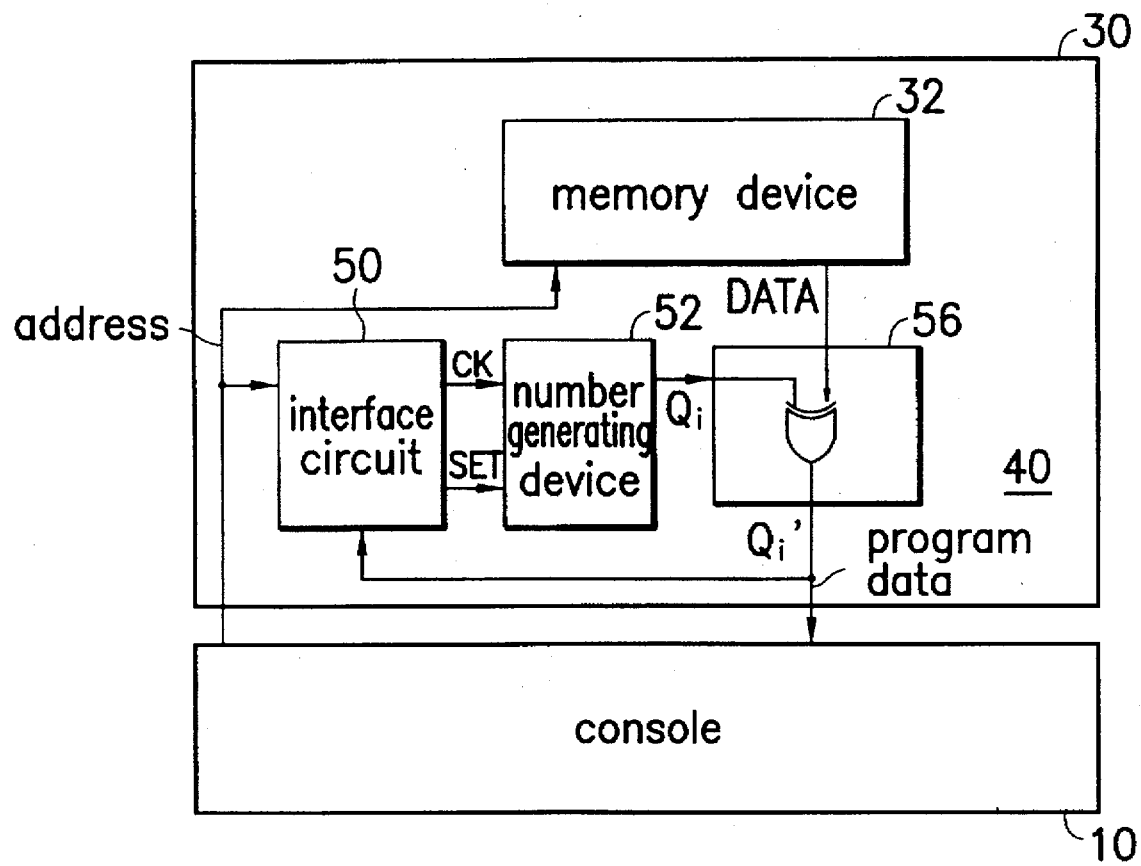
FIG. 6 shows a second embodiment of the TV game console with the protecting device according to the present invention.

FIGS. 4 to 6 show an embodiment of the TV game console with a structure shown in FIG. 1 according to the present invention. In this embodiment, a software cartridge 30 is provided with a dynamic protecting device 40 according to the present invention which is located between console 10 and memory device 32 in the data bus.

As shown in FIG. 4, the software cartridge 30 with the dynamic protecting device 40 includes an interface circuit 50 and a memory device 32. The interface circuit connects with address bus, data bus and control bus. The interface circuit 50 is a commonly used device which consists of decoder, data buffer or logic circuits and will not be further described hereinafter. The memory device 32 is used for storing encoded software program, which could be a read only memory or an erasable programmable ROM,EPROM or EEPROM, or the like.

When microprocessor 14 (shown in FIG. 1) in console 10 needs to read the software program stored in memory device 32, it will select the memory device according to a control signal $\overline{CS}$ of the control bus, and send the corresponding address of the program data on the adders bus, so that the memory device 32 will send the program data DATA on the data bus.

The software cartridge 30 includes a dynamic protecting device 40, which consists of a number generating device 52 and an decoder 56. Decoder 56 could be located between the memory device 32 and console 10 on the data bus, or the address bus or on the control bus.

The number generating device 52 generates a time-variant automatically changed number signal Qi. The number signal Qi and the program data come from the memory device 32 are input into the decoder 56, that then generates a decoded program data DATA'.

The software program DATA stored in memory device 32 can not be directly processed by the microprocessor 14 of the console 10, it must be decoded by decoder 56 so that the decoded program data DATA' can be executed by the microprocessor 14. That is, the software program stored in memory device 32 is encoded and can not be executed before it has been processed by the dynamic protecting device 40.

Figure 7:
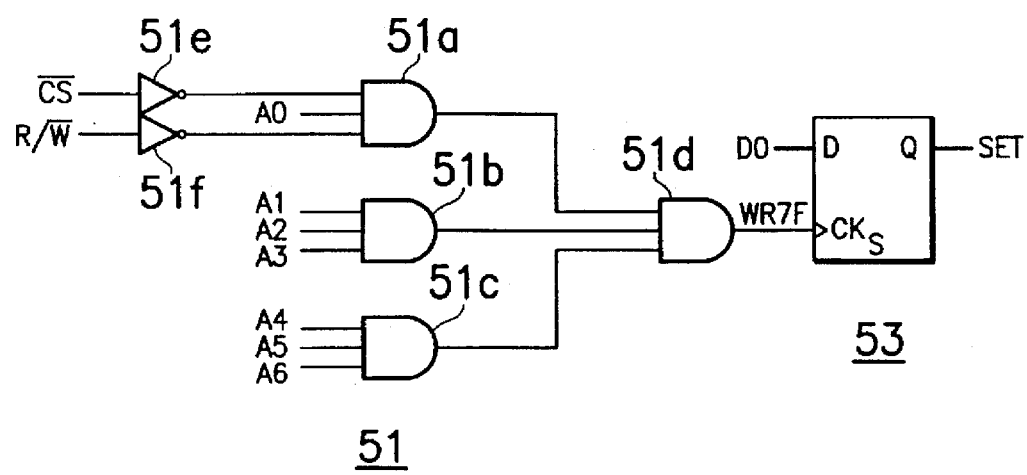
FIG. 7 shows an embodiment of the dynamic protecting device according to the present invention to generate an initial signal using an address decoder and a latch.

The number generating device 52 generates multiple number signals Qi according to a clock signal CK. An initial signal SET is used to set the initial value of the number signals Qi. The clock signal CK and the initial signal SET are obtained from the system bus through the interface circuit 50. A preferred embodiment shown in FIG. 7 includes a decoder 51 and a latch 53. The decoder 51 has AND gates 51a–51d to select a predetermined address signal, for example, to send address signal A0 of the address bus to AND gate 51a, signal A1–A3 to AND gate 51b, and signal A4–A6 to AND gate 51c. In the meantime, a control signal $\overline{CS}$ and a read/write signal R/$\overline{W}$ are input into AND gate 51a through NOT gates 51e and 51f. AND gate 51d obtains a latch signal WR7F according to the output of AND gates 51a–51c, so that, when control signal CS=0, read/write signal R/$\overline{W}$=0, and address signal A0–A6=1, latch signal WK7F will be set to 1 to the latch 53 by AND gates 51a–51d, so as to latch the data bit D0 on the data bus, and to output the initial signal SET according to the data bit D0 as follows:

D0=1, SET=1;

D0=0, SET=0.

The initial signal SET will cause the number generating device 52 to output the initial values of the number signals, and to generate a sequence of number signals according to the clock signal CK. The number signals and the program data DATA are input into the decoding device together, to generate decoded program data DATA'.

Figure 8:
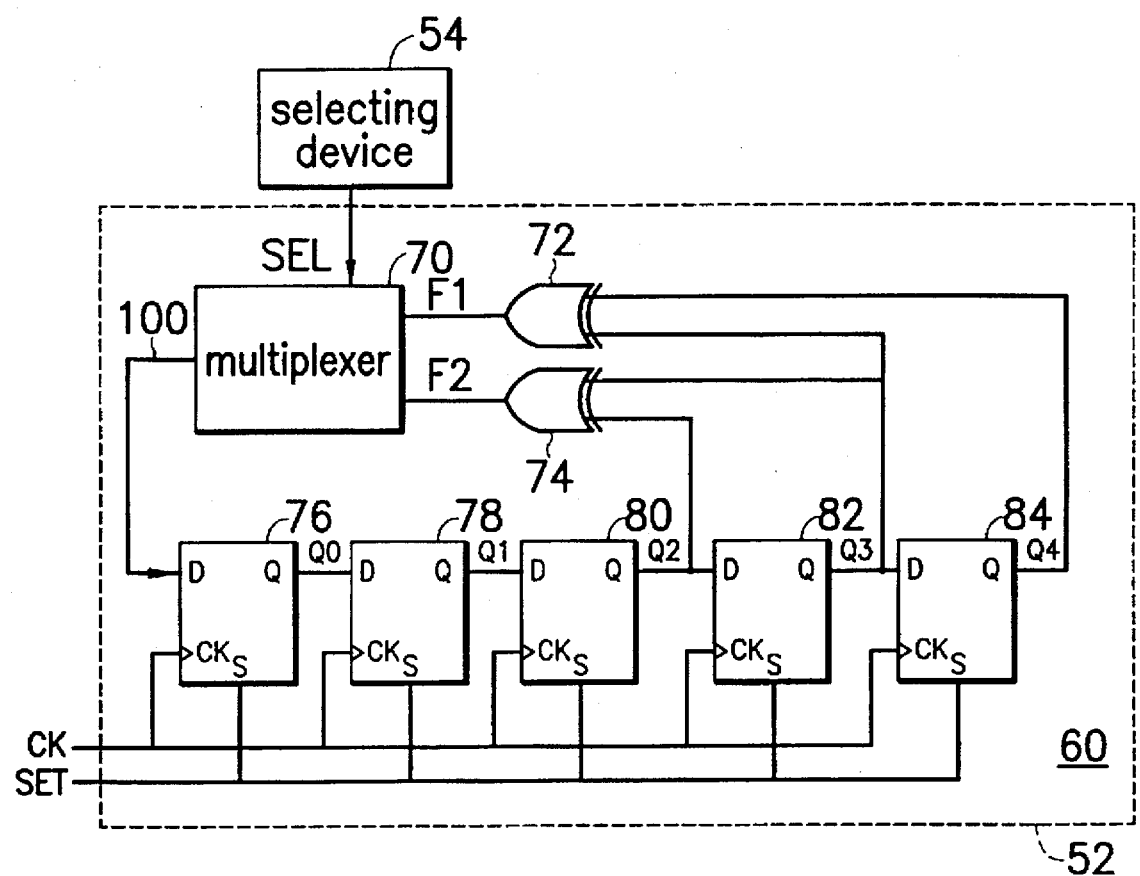
FIG. 8 shows an embodiment of the number generating device in the dynamic protecting device according to the present invention.

Furthermore, for providing more variations of the number signals Qi, an additional selecting device 54 could be adopted to the number generating device 52 as shown in FIG. 8 for selecting different methods to generate number signals, so as to increase the difficulty of cracking.

Several embodiments of TV game consoles with the software cartridge 30 having the above described dynamic protecting device 40 will be discussed below.

FIG. 5 shows a first embodiment of the TV game console which includes a console 10 and a software cartridge 30 connected with the console 10 through address bus, data bus, and control bus. The software cartridge 30 consists of a memory device 32, an interface circuit 50 and a dynamic protecting device 40.

The dynamic protecting device 40 shown in FIG. 5 includes a number generating device 52 and a decoder 56, wherein the decoder 56 is a connection status alternating device. The microprocessor 14 of the console 10 sends a initial signal SET through the interface circuit 50 to start the number generating device 52 and to generate a sequence of number signals Qi when the microprocessor 14 needs to read the program data DATA stored in the memory device 32. The decoder 56 alternates the connection status of signal lines of the data bus according to the number signal Qi, then outputs the program data DATA' which is decoded by the alteration of the connection status of signal lines.

In the present embodiment, the number signal Qi is an automatic time-variant dynamic signal which need not be changed by program, therefore it can automatically change the connection status of the signal lines randomly, which make analyzing and copying data very difficult.

FIG. 6 shows a second embodiment of the TV game console wherein the elements indicated with the same number and function as those in the first embodiment will not be further discussed.

The difference between the present embodiment and the first embodiment is that the decoder is a logic circuit 56. The logic circuit 56 has two sets of inputs and one set of output, which receives the number signal Qi from the number generating device 52 and the program data DATA from the memory device 32, then sends decoded program data DATA' after logic processes. The logic circuit 56 could be constructed by logic gates such as XOR gate, XNOR gate, or ADDER.

In the present embodiment, the number signal Qi is an automatic time-variant dynamic signal which needs not be changed by program, therefore it can automatically change the input of logic circuit(Qi) of the signal lines randomly, which make analyzing and copying data very difficult.

FIG. 8 shows the structure of the number generating device 52 which includes an N-bit random number generating device 60. In the present embodiment, the random number generating device 60 has an output of 5 bits (Q0–Q4).The initial signal SET from the interface circuit 50 sets the initial value of the number signals Q0–Q4 of the random number generating device to 1 as the first line of the number signals shown in FIGS. 9 and 10.

The clock signal CK is generated by the system clock. The random number generating device 60 consists of a shift register which includes five serially connected D type flip-flops. After the D type flip-flops 76, 78,–80, 82, and 84 set the initial values of outputs Q0–Q4 to 1, the next line of number signals is generated according to the clock signal CK.

A feedback circuit 100 is provided at the D input of the first D type flip-flop 76 to generate a feedback value F1 or F2 from a plurality of outputs old type flip-flops Q3, Q4 or Q2, Q3 by logic process device, e. g. XOR 72, 74. After each line of number signals is outputted, the feedback circuit 100 send a feedback value to the D input of the flip-flop 76 to change the next number signals. For example, FIG. 9 shows the output Q3, Q4 of the D type flip-flops 82, 84 are processed (XOR) to generate a feedback value F1 which changes the D input of the flip-flop 76 to generate another sequence of number signals.

Furthermore, for selecting different methods to generate different sequences of number signals, a selecting device 54 and a multiplexer 70 could be additionally provided. The selecting device 54 controls the output of the multiplexer 70 through a selecting signal SET. The inputs of the multiplexer include the feedback values F1 and F2. Therefore, the selecting device 54 could be used to control the multiplexer 70 to output feedback value F1 or F2 to the feedback circuit 100, and to decide the output of the number signals of the random number generating device 60 (Q0–Q4) to be the sequence shown in FIG. 9 or the sequence shown in FIG. 10.

The selecting device 54 could be a register, a memory device such as EPROM or EEPROM, or an IC made by conventional programmable process such as bonding option, metal option, or code implant. For example, by using bonding option, two kinds of IC with different sequences of number signals could be obtained by bonding this pad to Vcc or GND when packaging. By using metal option or code implant, the selecting device only needs an additional mask in the IC manufacturing process.

In the above discussed number generating device 52, the initial signal SET is used to set the output of the D type flip-flop Q0–Q4 to 1. However, the number generating device 52 could be a preloadable programmable linear feedback shift register as shown in FIG. 11.

Figure 11:
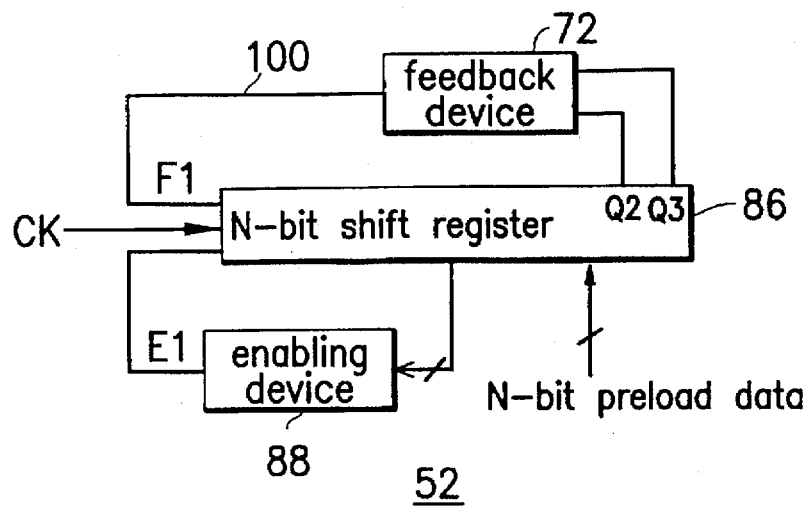
FIG. 11 shows the preloadable or programmable linear feedback shift register of the number generating device in the dynamic protecting device according to the present invention.
Figure 12:
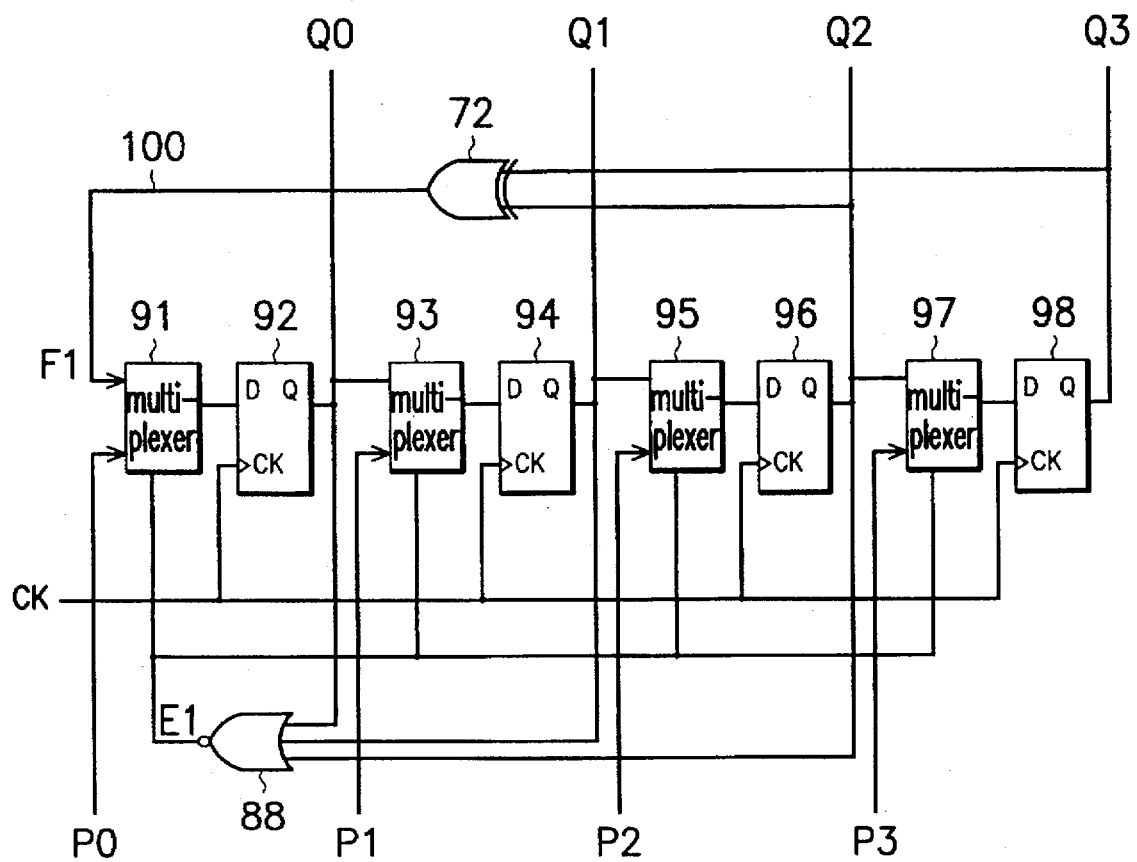
FIG. 12 shows an embodiment of the number generating device in the dynamic protecting device shown in FIG. 11 in the present invention.

FIG. 11 shows a random number generating device 52 wherein the elements indicated with same number and same function as those in the first embodiment will not be further discussed. The N-bit number signals $Q_0-Q_{N-1}$ (unshown) output from shift register and the program data from memory device 32 are input into the decoder 56 together. For example, a decoded program data is generated by a connection status shift device or a logic circuit and processed by the microprocessor 14 of the console 10 through the data bus. The characteristics of the linear feedback register with the preloadable and programmable initial value are that it has an enabling device 88 for generating enabling signal E1 according to the selected N-bit output of multiple number signals $Q_0-Q_{N-1}$, which makes the N-bit shift register 86 preloadable another random N-bit preloadable program data to be the initial value of the number signals $Q_0-Q_{N-1}$. A preferred embodiment as shown in FIGS. 12 to 14 is described as below:

The clock signal CK is generated by the system clock The N-bit shift register 86 consists of a shift register which includes four serially connected D type flip-flops. After the D type flip-flops 92, 94, 96, and 98 load a random N-bit preset program data P0–P3 as the initial values of number signals Q0–Q3, the next line of number signals is generated according to the clock signal CK. For example, a sequence of number signals as shown in FIG. 13 is generating by loading the initial value of 1101 and another sequence of number signals as show in FIG. 14 is generating by loading the initial value of 1011.

The D input of each flip-flop is connected to one of multiplexers 91,93,95,97. Each multiplexer has two inputs for deciding whether the D type flip-flop receives N-bit preset program data P0–P3 or the number signals output of another flip-flop of its previous stage. Enable device 88 could be a NOR gate for generating an enabling signal E1 according to selected number signals output to enable the multiplexers 91,93,95,97 so that the four bit shift register 86 could reload another random four-bit preset program data as the initial value of the number signals Q0–Q3. For example, as show in FIG. 13, when the number signals output Q0–Q3 becomes as 0001, the enable device 88 will set an enabling signal E1 to be 1 to enable the multiplexers 91,93,95,97 so that the D-type flip-flop could reload the initial value 1101. For the same reason, as shown in FIG. 14, when the number signals output Q0–Q3 becomes as 0001, the D-type flip-flop could reload the initial value 1011.

A feedback circuit 100 is provided at the D input of the first D type flip-flop 92 to generate a feedback value F1 from a plurality of output old type flip-flops, Q2 or Q3, by logic process device, e. g. XOR 72. When the mutiplexer 91 is not enabled by the enabling signal El, the feedback value F1 will be sent to the D input of the flip-flop 92 after each line of number signals is output, to change the output of the next line of number signals. As shown in FIG. 13, after an initial value 1101 is loaded, the outputs Q2 and Q3 of the D type flip-flops 96 and 98 are processed (XOR) to generate a feedback value F1 which changes the D input of the flip-flop 92 to generate next number.

When microprocessor 14 in console 10 needs to read the software program stored in memory device 32, it will send a control signal $\overline{CS}$ on the control bus to enable the memory device 32. After accessing the program data in the memory device 32, the feedback value F1 will be input into the first bit register 92 to generate new number signals $Q_0$-$Q_{N-1}$, and to change the connection status or logic process at the next access to the memory device 32. Therefore, the coding of the dynamic protecting device 40 automatically varies with time and need not be changed by program, so that it is difficult to crack.

The working principle of the ICE is to trap to a debug service routine in single step execution. However, since control signal $\overline{CS}$ is still generated to clock the number generator in the debug service routine, the ICE will get wrong program data in single step trace, so that it is more difficult to crack.

Furthermore, the above stated random number generating device could be used to generate random numbers for the software program to reduce cost.

While the invention has been described by way of example and in terms of preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A dynamic protecting device to protect program data transferred on a bus, which comprises;

a number generating device for generating a sequence of number signals;

a decoder located on the bus for receiving and decoding said program data and said sequential number signals to generate a decoded program data and then send said decoded program data to the bus;

at least one feedback device which includes;

a first logic circuit for generating a feedback value according to said number signals; and a feedback circuit, for receiving said feedback value and outputting said feedback value to said number generating device to generate said sequence of number signals; and wherein the number generating device further comprises a selecting device for generating a selecting signal and selecting said at least one feedback device according to the selecting signal to generate said sequence of number signals.

2. A dynamic protecting device for a data processing system which has a microprocessor and a memory device for storing encoded program data transferred through multiple lines of a bus, which comprises:

a number generating device for generating a sequence of number signals;

a decoder located on the bus for receiving and decoding said encoded program data and said sequence of umber signals to generate a decoded program data and then send said decoded program data to the microprocessor through the bus;

at least one feedback device which includes:

a first logic circuit for generating a feedback value according said number signals; and a feedback circuit for receiving said feedback value and outputting said feedback value to said number generating device to generate said sequence of number signals; and wherein the number generating device further comprises a selecting device for generating a selected signal and selecting said at least one feedback device according to the selecting signal to generate said sequence of number signals.

* * * * *